(12) United States Patent
Kim et al.

(10) Patent No.: US 11,795,973 B2
(45) Date of Patent: Oct. 24, 2023

(54) DEEP LEARNING-BASED COOLING SYSTEM TEMPERATURE PREDICTION APPARATUS ACCORDING TO PHYSICAL CAUSALITY AND METHOD THEREFOR

(71) Applicants: HYUNDAI MOTOR COMPANY, Seoul (KR); KIA MOTORS CORPORATION, Seoul (KR); POSTECH Research and Business Development Foundation, Pohang-si (KR)

(72) Inventors: Jae Woong Kim, Hwaseong-si (KR); Sang Shin Lee, Suwon-si (KR); So La Chung, Seoul (KR); Man Ju Oh, Yongin-si (KR); Young Jin Kim, Pohang-si (KR); Jong Hyun Park, Pohang-si (KR)

(73) Assignees: HYUNDAI MOTOR COMPANY, Seoul (KR); KIA MOTORS CORPORATION, Seoul (KR); POSTECH ACADEMY-INDUSTRY FOUNDATION, Pohang-si (KR)

(*) Notice: Subject to any disclaimer, the term of this patent is extended or adjusted under 35 U.S.C. 154(b) by 589 days.

(21) Appl. No.: 16/824,907

(22) Filed: Mar. 20, 2020

(65) Prior Publication Data

US 2021/0018016 A1    Jan. 21, 2021

(30) Foreign Application Priority Data

Jul. 18, 2019   (KR) .......................... 10-2019-0087170

(51) Int. Cl.
*F04D 29/58* (2006.01)
*F04D 13/06* (2006.01)
(Continued)

(52) U.S. Cl.
CPC ......... *F04D 29/588* (2013.01); *B60H 1/0073* (2019.05); *F04D 13/068* (2013.01);
(Continued)

(58) Field of Classification Search
CPC ............ G06N 3/08; B60H 2001/00307; B60H 2001/3238; B60H 2001/3272
See application file for complete search history.

(56) References Cited

U.S. PATENT DOCUMENTS

| 10,183,590 B2 * | 1/2019 | Juang ................. G06N 3/088 |
| 10,296,443 B2 | 5/2019 | Grechanik |
| 2018/0087360 A1 | 3/2018 | Conn et al. |

FOREIGN PATENT DOCUMENTS

| KR | 10-1325117 B1 | 11/2013 |
| KR | 101449276 B1 | 10/2014 |
| KR | 10-2018-0109099 A | 10/2018 |

* cited by examiner

*Primary Examiner* — Jamal Javaid
(74) *Attorney, Agent, or Firm* — Morgan, Lewis & Bockius LLP

(57) ABSTRACT

A deep learning-based cooling system temperature prediction apparatus has an artificial neural network modeled by connecting a plurality of artificial neural network submodels each including an input layer, a hidden layer, and an output layer is used. A pump flow speed, a cooling water flow rate, a battery inlet cooling water temperature, a motor inlet cooling water temperature, a radiator outlet cooling water temperature, a battery temperature, and a motor temperature are predicted by inputting at least one of a predetermined control variable, an environment variable, or a time variable to the plurality of artificial neural network submodels in accordance with a physical causality. A number of the plurality of artificial neural network submodels and the control variables or environment variables that are sequen- (Continued)

tially input to each submodel depend on divisional control and integral control of the cooling system.

16 Claims, 22 Drawing Sheets

(51) Int. Cl.
    *B60H 1/00*     (2006.01)
    *G06N 3/084*     (2023.01)
(52) U.S. Cl.
    CPC ........ *G06N 3/084* (2013.01); *F05B 2270/303* (2013.01); *F05B 2270/309* (2013.01); *F05B 2270/335* (2013.01); *F05B 2270/707* (2013.01); *F05B 2270/709* (2013.01)

ural network, and more particularly, to a deep learning-based cooling system temperature prediction apparatus and a method according to physical causality, the apparatus and method being able to elaborately predict battery temperature and motor temperature.

DEEP LEARNING-BASED COOLING SYSTEM TEMPERATURE PREDICTION APPARATUS ACCORDING TO PHYSICAL CAUSALITY AND METHOD THEREFOR

CROSS REFERENCE TO RELATED APPLICATION

The present application claims priority of Korean Patent Application No. 10-2019-0087170 filed on Jul. 18, 2019, the entire contents of which is incorporated herein for all purposes by this reference.

TECHNICAL FIELD

The present disclosure relates to a cooling system using an artificial neural network, and more particularly, to a deep learning-based cooling system temperature prediction apparatus and a method according to physical causality, the apparatus and method being able to elaborately predict battery temperature and motor temperature.

BACKGROUND

When temperature of a battery and a motor is predicted using an artificial neural network model to control a cooling system in the related art, the temperature is predicted by determining input/output variables only through statistical analysis of data without reflecting the physical relationship between the input/output variables.

However, according to this method, there is difficulty in physical analysis of the relationship with input in the result through a learned artificial neural network and it is difficult to know what process a change of input is derived through.

SUMMARY

In order to solve a problem that there is difficulty in analysis of a relationship between an input and a result predicted through an artificial neural network so that it is difficult to know what process a change of input is derived through, the present disclosure provides a deep learning-based cooling system temperature prediction apparatus and a method according to physical causality, the apparatus and method being able to elaborately predict and analyze battery temperature and motor temperature by reflecting the physical relationship of inputs/outputs of an artificial neural network by physically analyzing a formula about a temperature variation of a cooling system.

According to an aspect of the present disclosure, there is provided a deep learning-based cooling system temperature prediction apparatus according to physical causality, in which an artificial neural network modeled by connecting a plurality of artificial neural network submodels each including an input layer, a hidden layer, and an output layer is used, wherein a pump flow speed, a cooling water flow rate, a battery inlet cooling water temperature, a motor inlet cooling water temperature, a radiator outlet cooling water temperature, a battery temperature, and a motor temperature are predicted by inputting at least one of a control variable, an environment variable, or a time variable to the plurality of artificial neural network submodels in accordance with the physical causality, and wherein a number of the plurality of the artificial neural network submodels and the control variables or environment variables that are sequentially input to each submodel, depend on a divisional control and an integral control of the cooling system.

When the cooling system is divisionally controlled, calculation may be performed through first, second, and third submodels to predict the temperature of the battery. The first submodel calculates a battery pump flow speed by inputting a battery pump power consumption variable, the second submodel calculates battery inlet cooling water temperature by inputting air fan power consumption, compressor power consumption, an AC on or off state, battery current, and battery pump flow rate variables, and the third submodel calculates battery prediction temperature by inputting the battery current, the battery inlet cooling water temperature, and the battery pump flow rate variables.

When the cooling system is divisionally controlled, calculation may be performed through first, second, and third submodels to predict the temperature of the motor. The first submodel calculates a PE cooling water flow rate by inputting PE pump power consumption variable, the second submodel calculates PE inlet cooling water temperature by inputting the air fan power consumption, PE cooling water flow rate, motor power consumption, external temperature, vehicle speed, and inverter temperature variables, and the third submodel calculates motor prediction temperature by inputting PE inlet cooling water temperature, PE cooling water flow rate, motor power consumption, inverter temperature, and battery voltage variables.

When the cooling system is integrally controlled, calculation may be performed through first, second, third, fourth, and fifth submodels to predict the temperature of the motor. The first submodel calculates a cooling water flow rate by inputting PE pump power consumption variable, the second submodel that calculates radiator outlet cooling water temperature by inputting air fan power consumption, cooling water flow rate, motor power consumption, external temperature, vehicle speed, and inverter temperature variables, the third submodel calculates battery prediction temperature by inputting radiator outlet cooling water temperature, cooling water flow rate, and battery current variables, the fourth submodel calculates PE inlet cooling water temperature by inputting radiator outlet cooling water temperature, vehicle speed, battery prediction temperature, external air temperature, and cooling water flow rate variables, and the fifth submodel calculates motor prediction temperature by inputting motor power consumption, cooling water flow rate, PE inlet cooling water temperature, battery voltage, and inverter temperature variables.

In order to learn the artificial neural network, the apparatus may calculate a battery pump flow rate by inputting a battery pump power consumption variable, and a battery pump flow rate variable of a previous prediction section as a feedback variable to the first submodel; may calculate battery inlet cooling water temperature by inputting air fan power consumption, compressor power consumption, the AC on or off state, battery current, and battery pump flow rate variables, and a battery inlet cooling water temperature variable of the previous prediction section as a feedback variable to the second submodel; and may calculate battery prediction temperature by inputting battery current, battery inlet cooling water temperature, and battery pump flow rate variables, and a battery prediction temperature variable as a feedback variable to the third submodel.

In order to learn the artificial neural network, the first submodel may calculate the PE cooling water flow rate by inputting the PE pump power consumption variable, and the PE cooling water flow rate variable of the previous prediction section as a feedback variable; the second submodel may calculate the PE inlet cooling water temperature by inputting the air fan power consumption, PE cooling water flow rate, motor power consumption, external temperature, vehicle speed, and inverter temperature variables, and the PE inlet cooling water temperature of the previous prediction section as a feedback variable; and the third submodel may calculate the motor prediction temperature by inputting the PE inlet cooling water temperature, PE cooling water flow rate, motor power consumption, inverter temperature, and battery voltage variables, and the motor prediction temperature of the previous prediction section as a feedback variable.

In order to learn the artificial neural network, the second submodel may calculate the radiator outlet cooling water temperature by inputting the air fan power consumption, cooling water flow rate, motor power consumption, external air temperature, vehicle speed, and inverter temperature variables, and the radiator outlet cooling water temperature variable of the previous prediction section as a feedback variable; the third submodel may calculate the battery prediction temperature by inputting the radiator outlet cooling water temperature, cooling water flow rate, and battery current variables, and the battery prediction temperature variable of the previous prediction section as a feedback variable; the fourth submodel may calculate the PE inlet cooling water temperature by inputting the radiator outlet cooling water temperature, vehicle speed, battery prediction temperature, external air temperature, and cooling water flow rate variables, and the PE inlet cooling water temperature variable of the previous prediction section as a feedback variable; and the fifth submodel may calculate the motor prediction temperature by inputting the motor power consumption, cooling water flow rate, PE inlet cooling water temperature, battery voltage, and inverter temperature variables, and the motor prediction temperature variable of the previous prediction section as a feedback variable.

The plurality of submodels may use a rectified linear unit (ReLU) as an active function.

According to another aspect of the present disclosure, a deep learning-based cooling system temperature prediction method according to a physical causality uses an artificial neural network modeled by connecting a plurality of artificial neural network submodels each including an input layer, a hidden layer, and an output layer. The method may include: determining a control mode as one of a divisional control and an integral control; selecting at least one of a control variable, an environment variable, or a time variable set in advance in the plurality of artificial neural network submodels, depending on the divisional control and the integral control, in accordance with the physical causality, for a number of the plurality of artificial neural network submodels and a control variable or an environment variable that are sequentially input to each submodel of the artificial neural network in accordance with the determined control mode; predicting a pump flow speed, a cooling water flow rate, a battery inlet cooling water temperature, a motor inlet cooling water temperature, a radiator outlet cooling water temperature, a battery temperature, and a motor temperature by inputting the selected variable to the plurality of artificial neural network submodels; and learning the plurality of artificial neural network submodels by using the variables predicted in the submodels as feedback variables.

When the cooling system is divisionally controlled, calculation may be performed through first, second, and third submodels to predict the temperature of the battery, and the method may further include: calculating a battery pump flow speed by inputting a battery pump power consumption variable in the first submodel; calculating battery inlet cooling water temperature by inputting air fan power consumption, compressor power consumption, the AC on or off state, battery current, and battery pump flow rate variables in the second submodel; and calculating battery prediction temperature by inputting battery current, the battery inlet cooling water temperature, and battery pump flow rate variables in the third submodel.

When the cooling system is divisionally controlled, calculation may be performed through first, second, and third submodels to predict the temperature of the motor, and the method may further include: calculating a PE cooling water flow rate by inputting PE pump power consumption variable in the first submodel; calculating PE inlet cooling water temperature by inputting the air fan power consumption, PE cooling water flow rate, motor power consumption, external temperature, vehicle speed, and inverter temperature variables in the second submodel; and calculating motor prediction temperature by inputting PE inlet cooling water temperature, PE cooling water flow rate, motor power consumption, inverter temperature, and battery voltage variables in the third submodel.

When the cooling system is integrally controlled, calculation may be performed through first, second, third, fourth, and fifth submodels to predict the temperature of the motor, and the method may further include: calculating a cooling water flow rate by inputting PE pump power consumption variable in the first submodel; calculating radiator outlet cooling water temperature by inputting air fan power consumption, cooling water flow rate, motor power consumption, external temperature, vehicle speed, and inverter temperature variables in the second submodel; calculating battery prediction temperature by inputting radiator outlet cooling water temperature, cooling water flow rate, and battery current variables in the third submodel; calculating PE inlet cooling water temperature by inputting radiator outlet cooling water temperature, a vehicle speed, battery prediction temperature, external air temperature, and cooling water flow rate variables in the fourth submodel; and calculating motor prediction temperature by inputting motor power consumption, cooling water flow rate, PE inlet cooling water temperature, battery voltage, and inverter temperature variables in the fifth submodel.

In order to learn the artificial neural network, the apparatus may calculate a battery pump flow rate by inputting a battery pump power consumption variable, and a battery pump flow rate variable of a previous prediction section as a feedback variable to the first submodel; may calculate battery inlet cooling water temperature by inputting air fan power consumption, compressor power consumption, the AC on or off state, battery current, and battery pump flow rate variables, and a battery inlet cooling water temperature variable of the previous prediction section as a feedback variable to the second submodel; and may calculate battery prediction temperature by inputting battery current, battery inlet cooling water temperature, and battery pump flow rate variables, and a battery prediction temperature variable of the previous prediction section as a feedback variable to the third submodel.

In order to learn the artificial neural network, the first submodel may calculate the PE cooling water flow rate by inputting the PE pump power consumption variable, and the PE cooling water flow rate variable of the previous prediction section as a feedback variable; the second submodel may calculate the PE inlet cooling water temperature by inputting the air fan power consumption, PE cooling water flow rate, motor power consumption, external temperature, vehicle speed, and inverter temperature variables, and the PE inlet cooling water temperature of the previous prediction section as a feedback variable; and the third submodel may calculate the motor prediction temperature by inputting the PE inlet cooling water temperature, PE cooling water flow rate, motor power consumption, inverter temperature, and battery voltage variables, and the motor prediction temperature of the previous prediction section as a feedback variable.

In order to learn the artificial neural network, the second submodel may calculate the radiator outlet cooling water temperature by inputting the air fan power consumption, cooling water flow rate, motor power consumption, external air temperature, vehicle speed, and inverter temperature variables, and the radiator outlet cooling water temperature variable of the previous prediction section as a feedback variable; the third submodel may calculate the battery prediction temperature by inputting the radiator outlet cooling water temperature, cooling water flow rate, and battery current variables, and the battery prediction temperature variable of the previous prediction section as a feedback variable; the fourth submodel may calculate the PE inlet cooling water temperature by inputting the radiator outlet cooling water temperature, vehicle speed, battery prediction temperature, external air temperature, and cooling water flow rate variables, and the PE inlet cooling water temperature variable of the previous prediction section as a feedback variable; and the fifth submodel may calculate the motor prediction temperature by inputting the motor power consumption, cooling water flow rate, PE inlet cooling water temperature, battery voltage, and inverter temperature variables, and the motor prediction temperature variable of the previous prediction section as a feedback variable.

The plurality of submodels may use an ReLU as an active function.

According to the present disclosure, input and output are predicted not simply only through one artificial neural network, but through a plurality of artificial neural networks respectively for main components in a plurality of steps of complicated system learning by physically analyzing a formula about a cooling system temperature variable, which performs calculation through an artificial neural network by randomly receiving variables, so it is possible to know the prediction process of the artificial neural networks.

Further, in the related art in which input/output is determined through statistical analysis of data, when non-learned input is input to an artificial neural network and an irrational output value is derived, it is very difficult to trace the reason. However, according to the present disclosure, there is and advantage in that it is possible to trace the prediction process of the artificial neural networks, and it is relatively easy to find out the reason.

Further, under a condition of low variability of data, it is possible to check whether predicted variables reflect the physical characteristics of a cooling system through an artificial neural network evaluation process, and the configuration of the artificial neural network is changed in accordance with a mode change of the cooling system according to conditions. Therefore, it is possible to provide an effect that it is possible to elaborately predict temperature.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
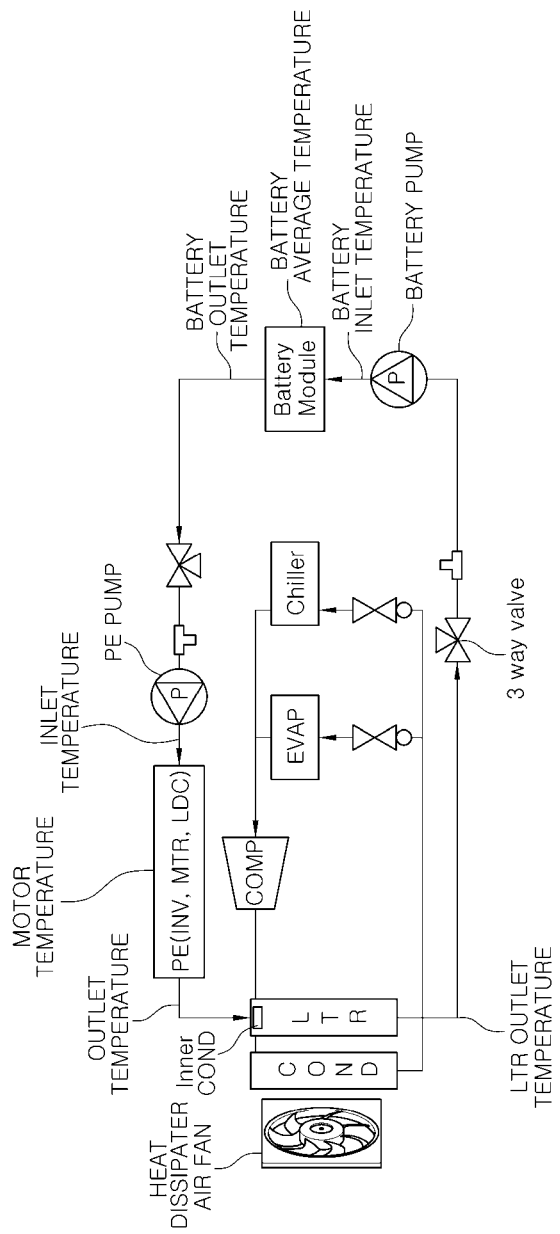
FIG. 1 is a diagram showing a cooling system that is integrally controlled in accordance with an embodiment of the present disclosure.

Embodiments of the present disclosure will be described in detail with reference to the accompanying drawings for those skilled in the art to be able to easily implement the present disclosure. However, the present disclosure may be modified in various different ways and is not limited to the embodiments described herein.

Further, in the accompanying drawings, components irrelevant to the description will be omitted in order to clearly describe the present disclosure, and similar reference numerals will be used to describe similar components throughout the specification.

Through the present specification, unless explicitly described otherwise, "comprising" any components will be understood to imply the inclusion of other components rather than the exclusion of any other components.

Hereafter, a deep learning-based cooling system temperature prediction apparatus and method according to physical causality according to an embodiment of the present disclosure is described.

FIG. 1 is a diagram showing a cooling system that is integrally controlled in accordance with an embodiment of the present disclosure.

Referring to FIG. 1, a cooling system may be integrally controlled when battery temperature and a radiator outlet temperature are compared and the battery temperature is higher.

In integral control according to FIG. 1, a 3-way valve is operated such that the cooling system is integrally controlled, and a PE pump, an air fan, and a battery pump can also be operated, but a compressor is not operated.

Figure 2:
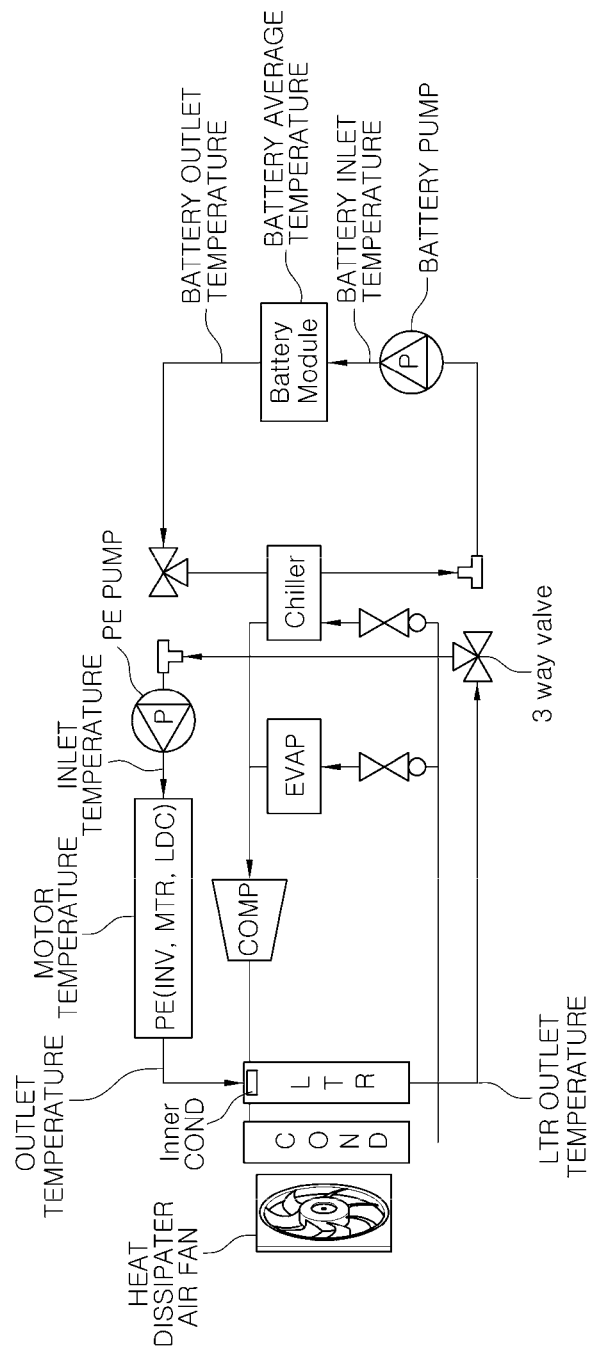
FIG. 2 is a diagram showing a cooling system that is divisionally controlled in accordance with an embodiment of the present disclosure.

FIG. 2 is a diagram showing a cooling system that is divisionally controlled in accordance with an embodiment of the present disclosure.

Referring to FIG. 2, a cooling system may be divisionally controlled when battery temperature and a radiator outlet temperature are compared and the battery temperature is low.

In integral control according to FIG. 1, a 3-way valve is operated such that the cooling system is divisionally controlled, and a PE pump, an air fan, a battery pump, and a compressor can also be operated.

Figure 3:
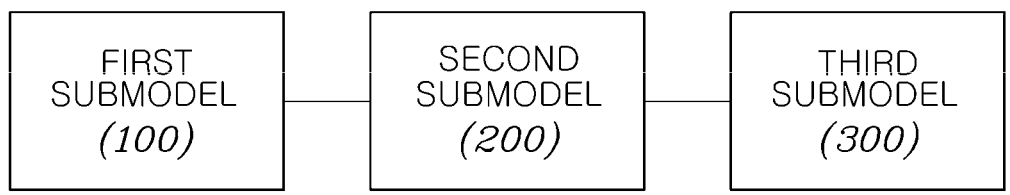
FIG. 3 is a diagram showing the configuration of a cooling system temperature prediction apparatus in divisional control in accordance with an embodiment of the present disclosure.

FIG. 3 is a diagram showing the configuration of a cooling system temperature prediction apparatus in divisional control in accordance with an embodiment of the present disclosure.

Referring to FIG. 3, the cooling system temperature prediction apparatus in divisional control according to an embodiment of the present disclosure may include a first sub-model 100, a second sub-model 200, and a third sub-model 300.

According to an embodiment of the present disclosure, it is possible to predict the temperature of a motor or a battery using the cooling system temperature prediction apparatus in divisional control.

According to an embodiment of the present disclosure, an artificial neural network formed by connecting artificial neural network submodels each including an input layer, a hidden layer, and an output layer is used. At least one of predetermined control variable, environment variable, and time variable is input to a plurality of submodels in accordance with a predetermined physical causality, thereby being able to sequentially predict a pump flow speed, a cooling water flow rate, an inlet cooling water temperature of a battery and a motor, and output cooling water temperature of a radiator, battery temperature, and motor temperature. The number of the submodels of the artificial neural network, and the control variables and environment variables that are sequentially input to each submodel may depend on divisional control and integral control of the cooling system.

The predetermined physical causality may be based on a formula that can calculate a system temperature variation of the cooling system, as seen in the following Formula 1.

$$MC_p \frac{dT_s}{dt} = \dot{Q} + \dot{m}c(T_{cool} - T_s) \quad \text{[Formula 1]}$$

Referring to Formula 1, it can be seen that the temperature variation $MC_p$ of the cooling system can be calculated by adding a product of a flow rate $\dot{m}c$ and a lost heat amount $T_{cool}-T_s$ to a heat generation amount $\dot{Q}$, so the following physical causality can be derived.

Accordingly, the flow rate is proportionate to the pump power, and the battery inlet cooling water temperature decreases as the wind amount of the fan increases, the operation amount of the compressor increases, and the battery output current decreases. Further, when the flow rate is large, the changed level of temperature may decrease.

Further, prediction temperature of the battery may increase as the heat generation amount increases, and may decrease as the temperature of cooling water decreases and the flow rate increases.

According to an embodiment of the present disclosure, the PE inlet cooling water temperature decreases as the wind amount increases, the temperature variation may decrease as the flow rate increases, and the external air temperature may increase as the motor power consumption increases.

Further, when a vehicle speed is high, a radiator (RAD)-through wind amount increases, so the PE inlet cooling water temperature may decrease, and may increase as inverter temperature increases.

According to an embodiment of the present disclosure, prediction temperature of a motor may increase as the heat generation amount increases, and may decrease as the cooling water temperature decreases and the flow rate increases.

Figure 4:
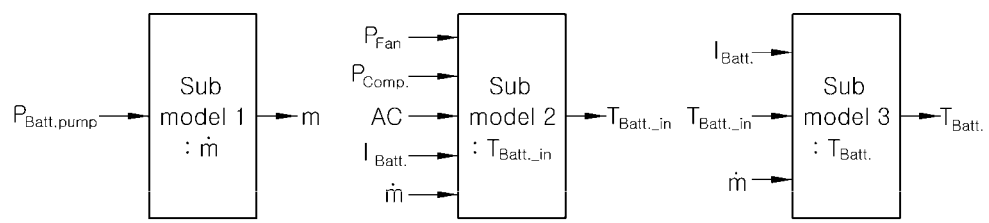
FIG. 4 is a diagram showing variables that are input to each sub-model of a cooling system temperature prediction apparatus for predicting battery temperature in divisional control in accordance with an embodiment of the present disclosure.
Figure 6:
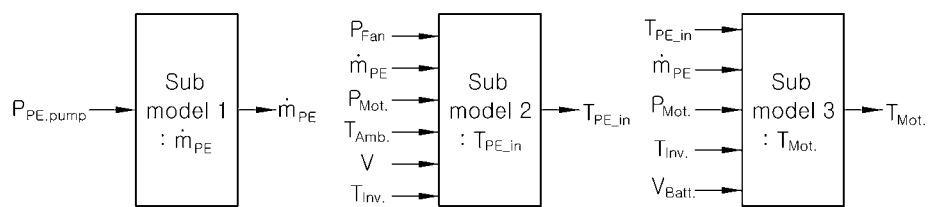
FIG. 6 is a diagram showing variables that are input to each sub-model of cooling system temperature prediction apparatus for predicting motor temperature in divisional control in accordance with an embodiment of the present disclosure.
Figure 9:
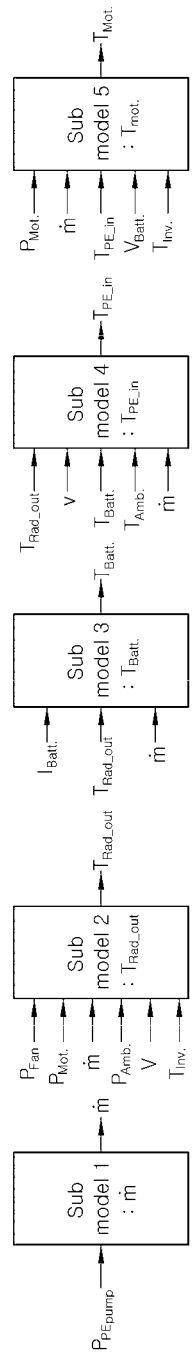
FIG. 9 is a diagram showing variables that are input to each sub-model of a cooling system temperature prediction apparatus for predicting battery and motor temperature in integral control according to an embodiment of the present disclosure.

The justification of inputting specific variables to a plurality of submodels, as shown in FIGS. 4, 6, and 9, can be derived from this physical causality.

According to an embodiment of the present disclosure, the plurality of submodels may use a rectified linear unit (ReLU) as an active function.

FIG. 4 is a diagram showing variables that are input to each sub-model of cooling system temperature prediction apparatus for predicting battery temperature in divisional control in accordance with an embodiment of the present disclosure.

Referring to FIG. 4, the cooling system temperature prediction apparatus for predicting battery temperature in divisional control can use three submodels (first, second, and third submodels) to predict temperature of a battery and the variables that are input to and output from each submodel are as follows.

The variables that can be input to each submodel of FIG. 4 are as seen in the following Table 1.

TABLE 1

| Item | symbol | Meaning | Item | symbol | Meaning |
|---|---|---|---|---|---|
| Control variable | $P_{Fan}$ | Air fan power consumption | Environment variable | AC | AC on/off |
| | $P_{Batt.pump}$ | Battery pump power consumption | | $\dot{m}$ | Battery pump flow rate of |

TABLE 1-continued

| Item | symbol | Meaning | Item | symbol | Meaning |
|---|---|---|---|---|---|
| | $P_{Comp}$ | Compressor power consumption | $I_{Batt.}$ | | Battery current |
| output | $T_{Batt.}$ | Battery temperature | $T_{Batt.\_in}$ | | Battery inlet cooling water temperature |

According to an embodiment of the present disclosure, the first submodel can calculate a battery pump flow speed by inputting a battery pump power consumption variable.

Further, the second submodel can calculate the battery inlet cooling water temperature by inputting air fan power consumption, compressor power consumption, AC on or off, battery current, and battery pump flow rate variables.

Further, the third submodel can calculate battery prediction temperature by inputting battery current, battery input cooling water, and battery pump flow rate variables.

Figure 5:
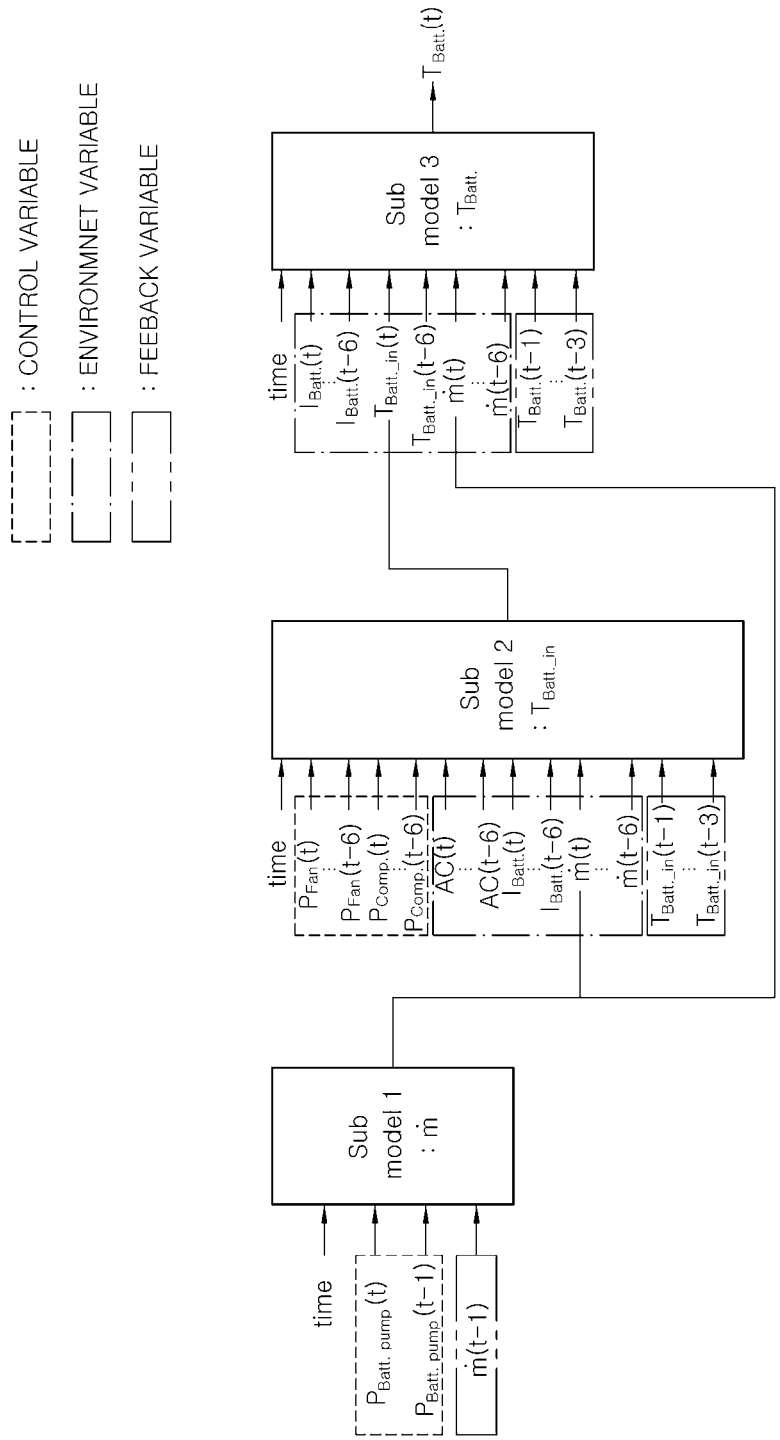
FIG. 5 is a diagram showing variables that are input to each sub-model including feedback variables for re-learning in a cooling system temperature prediction apparatus for predicting battery temperature in divisional control in accordance with an embodiment of the present disclosure.

FIG. 5 is a diagram showing variables that are input to each sub-model including feedback variables for re-learning in cooling system temperature prediction apparatus for predicting battery temperature in divisional control in accordance with an embodiment of the present disclosure.

FIG. 5 is a diagram showing variables that are input to each sub-model including feedback variables for re-learning in cooling system temperature prediction apparatus for predicting battery temperature in accordance with an embodiment of the present disclosure.

Referring to FIG. 5, the cooling system temperature prediction apparatus for predicting battery temperature in divisional control can use three submodels (first, second, and third submodels) to predict and re-learn temperature of a battery and the variables that are input to and output from each submodel are as follows.

According to an embodiment of the present disclosure, it is possible to calculate a battery pump flow rate by inputting a battery pump power consumption variable, and a battery pump flow rate variable of the previous prediction section a feedback variable to the first submodel.

Further, it is possible to calculate a battery inlet cooling water temperature by inputting air fan power consumption, compressor power consumption, AC on or off, battery current, and battery pump flow rate variables, and a battery inlet cooling water temperature variable of the previous prediction section as a feedback variable to the second submodel. Further, it is possible to calculate the battery prediction temperature by inputting battery current, battery inlet cooling water temperature, and battery pump flow rate variables, and a battery prediction temperature variable of the previous prediction section as a feedback variable to the third submodel.

FIG. 6 is a diagram showing variables that are input to each sub-model of cooling system temperature prediction apparatus for predicting motor temperature in divisional control in accordance with an embodiment of the present disclosure.

Referring to FIG. 6, the cooling system temperature prediction apparatus for predicting motor temperature in divisional control can use three submodels (first, second, and third submodels) to predict temperature of a battery and the variables that are input to and output from each submodel are as follows.

The variables that can be input to each submodel of FIG. 6 are as seen in the following Table 2.

TABLE 2

| Item | symbol | Meaning | Item | symbol | Meaning |
|---|---|---|---|---|---|
| Control variable | $P_{Fan}$ | Air fan power consumption | Environment variable | $I_{Batt.}$ | Battery current |
| | | | | $V_{Batt.}$ | Battery voltage |
| | $P_{PE\ pump}$ | PE pump power consumption | | $T_{Batt.}$ | Battery temperature |
| | | | | $T_{PE\_in}$ | PE inlet cooling water temperature |
| Environment variable | $P_{Mot}$ | Motor power consumption | | $T_{Mot.}$ | Motor coil temperature |
| | $TRad\_out$ | Radiator outlet cooling water temperature | | v | Vehicle speed |
| | ṁ | Cooling water flow rate | | $T_{Inv.}$ | Inverter temperature |
| | $T_{Amb}$ | External air temperature | | | |

According to an embodiment of the present disclosure, the first submodel can calculate the PE cooling water flow rate by inputting the PE pump power consumption variable and the second submodel can calculate the PE inlet cooling water temperature by inputting the air fan power consumption, PE cooling water flow rate, motor power consumption, external temperature, vehicle speed, and inverter temperature variables.

According to the embodiment, the third submodel can calculate motor prediction temperature by inputting the PE inlet cooling water temperature, PE cooling water flow rate, motor power consumption, inverter temperature, and battery voltage variables.

Figure 7:
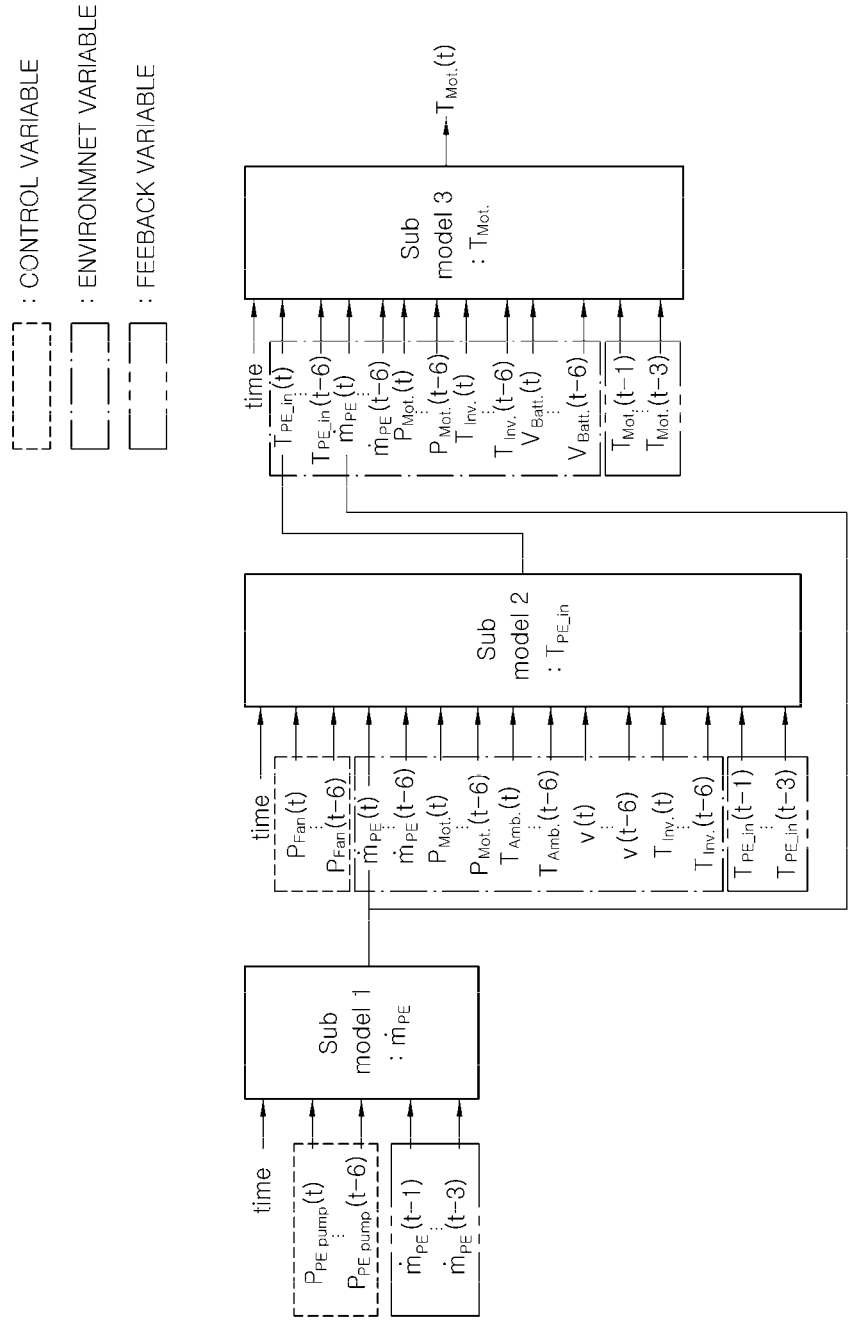
FIG. 7 is a diagram showing variables that are input to each sub-model including feedback variables for re-learning in a cooling system temperature prediction apparatus for predicting motor temperature in divisional control in accordance with an embodiment of the present disclosure.

FIG. 7 is a diagram showing variables that are input to each sub-model including feedback variables for re-learning in cooling system temperature prediction apparatus for predicting motor temperature in divisional control in accordance with an embodiment of the present disclosure.

Referring to FIG. 7, the cooling system temperature prediction apparatus for predicting motor temperature in divisional control can use three submodels (first, second, and third submodels) to predict and re-learn temperature of a battery and the variables that are input to and output from each submodel are as follows.

According to an embodiment of the present disclosure, the first submodel can calculate the PE cooling water flow rate by inputting the PE pump power consumption variable, and the PE cooling water flow rate variable of the previous prediction section as a feedback variable, and the second submodel can calculate the PE inlet cooling water temperature by inputting the air fan power consumption, PE cooling water flow rate, motor power consumption, external temperature, vehicle speed, and inverter temperature variables, and the PE inlet cooling water temperature of the previous prediction section as a feedback variable.

Further, the third submodel can calculate the motor prediction temperature by inputting the PE inlet cooling water temperature, PE cooling water flow rate, motor power consumption, inverter temperature, and battery voltage variables, and the motor prediction temperature of the previous prediction section as a feedback variable.

Figure 8:
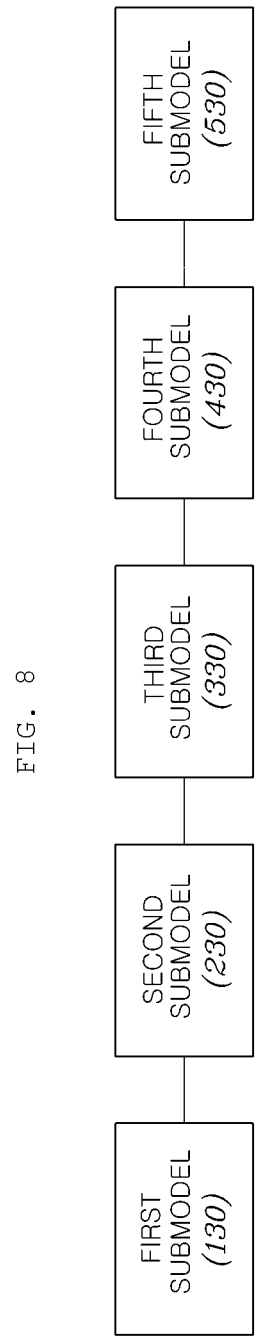
FIG. 8 is a diagram showing the configuration of a cooling system temperature prediction apparatus in integral control according to an embodiment of the present disclosure.

FIG. 8 is a diagram showing the configuration of a cooling system temperature prediction apparatus in integral control according to an embodiment of the present disclosure.

Referring to FIG. 8, a cooling system temperature prediction apparatus in integral control according to an embodiment can perform calculation through five submodels (first, second, third, fourth, and fifth submodels) to predict temperature of a battery and a motor.

FIG. 9 is a diagram showing variables that are input to each sub-model of cooling system temperature prediction apparatus for predicting battery and motor temperature in integral control according to an embodiment of the present disclosure.

The variables that can be input to each submodel of FIG. 9 are as seen in the following Table 3.

TABLE 3

| Item | symbol | Meaning | Item | symbol | Meaning |
| --- | --- | --- | --- | --- | --- |
| Control variable | $P_{Fan}$ | Air fan power consumption | Environment variable | $I_{Batt.}$ | Battery current |
| | | | | $V_{Batt.}$ | Battery voltage |
| | $P_{PE\ pump}$ | PE pump power consumption | | $T_{Batt.}$ | Battery temperature |
| | | | | $T_{PE\_in}$ | PE inlet cooling water temperature |
| Environment variable | $P_{Mot}$ | Motor power consumption | | $T_{Mot.}$ | Motor prediction temperature |
| | TRad_out | Radiator outlet cooling water temperature | | v | Vehicle speed |
| | $\dot{m}$ | Cooling water flow rate | | $T_{Inv.}$ | Inverter temperature |
| | $T_{Amb}$ | External air temperature | | | |

According to an embodiment of the present disclosure, the first submodel 130 can calculate the cooling water flow rate by inputting the PE pump power consumption variable and the second submodel 230 can calculate the radiator outlet cooling water temperature by inputting the air fan power consumption, cooling water flow rate, motor power consumption, external temperature, vehicle speed, and inverter temperature variables.

Further, according to the embodiment, the third submodel (330) can calculate the battery prediction temperature by inputting the radiator outlet cooling water temperature, cooling water flow rate, and battery current variables, and the fourth submodel can calculate the PE inlet cooling water temperature by inputting the radiator outlet cooling water temperature, a vehicle speed, battery prediction temperature, external air temperature, and cooling water flow rate variables.

According to the embodiment, the fifth submodel can calculate motor prediction temperature by inputting the motor power consumption, cooling water flow rate, PE inlet cooling water temperature, battery voltage, and inverter temperature variables.

Figure 10:
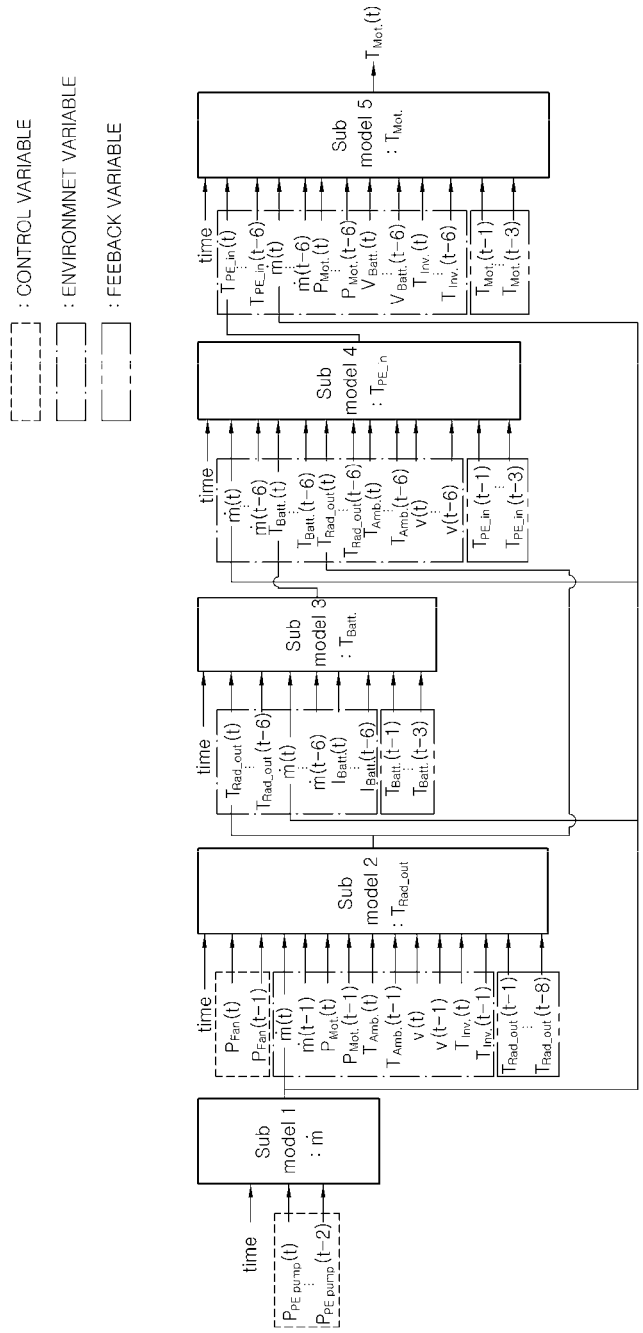
FIG. 10 is a diagram showing variables that are input to each sub-model including feedback variables for re-learning in a cooling system temperature prediction apparatus for predicting battery and motor temperature in integral control in accordance with an embodiment of the present disclosure.

FIG. 10 is a diagram showing variables that are input to each sub-model including feedback variables for re-learning in a cooling system temperature prediction apparatus for predicting battery and motor temperature in integral control in accordance with an embodiment of the present disclosure.

According to an embodiment of the present disclosure, it is possible to perform re-learning by inputting the variables described above and additionally inputting a specific variable calculated in the previous prediction section as a feedback variable to the second to fifth submodels.

According to an embodiment, the second submodel can calculate the radiator output cooling water temperature by inputting the air fan power consumption, cooling water flow rate, motor power consumption, external air temperature, vehicle speed, and inverter temperature variables, and the radiator outlet cooling water temperature variable of the previous prediction section as a feedback variable.

According to the embodiment, the third submodel can calculate the battery prediction temperature by inputting the radiator outlet cooling water temperature, cooling water flow rate, and battery current variables, and the battery prediction temperature variable of the previous prediction section as a feedback variable.

According to the embodiment, the fourth submodel can calculate the PE inlet cooling water temperature by inputting the radiator outlet cooling water temperature, vehicle speed, battery prediction temperature, external air temperature, and cooling water flow rate variables, and the PE inlet cooling water temperature variable of the previous prediction section as a feedback variable. Further, the fifth submodel can calculate the motor prediction temperature by inputting the motor power consumption, cooling water flow rate, PE inlet cooling water temperature, battery voltage, and inverter temperature variables, and the motor prediction temperature variable of the previous prediction section as a feedback variable.

Figure 11A:
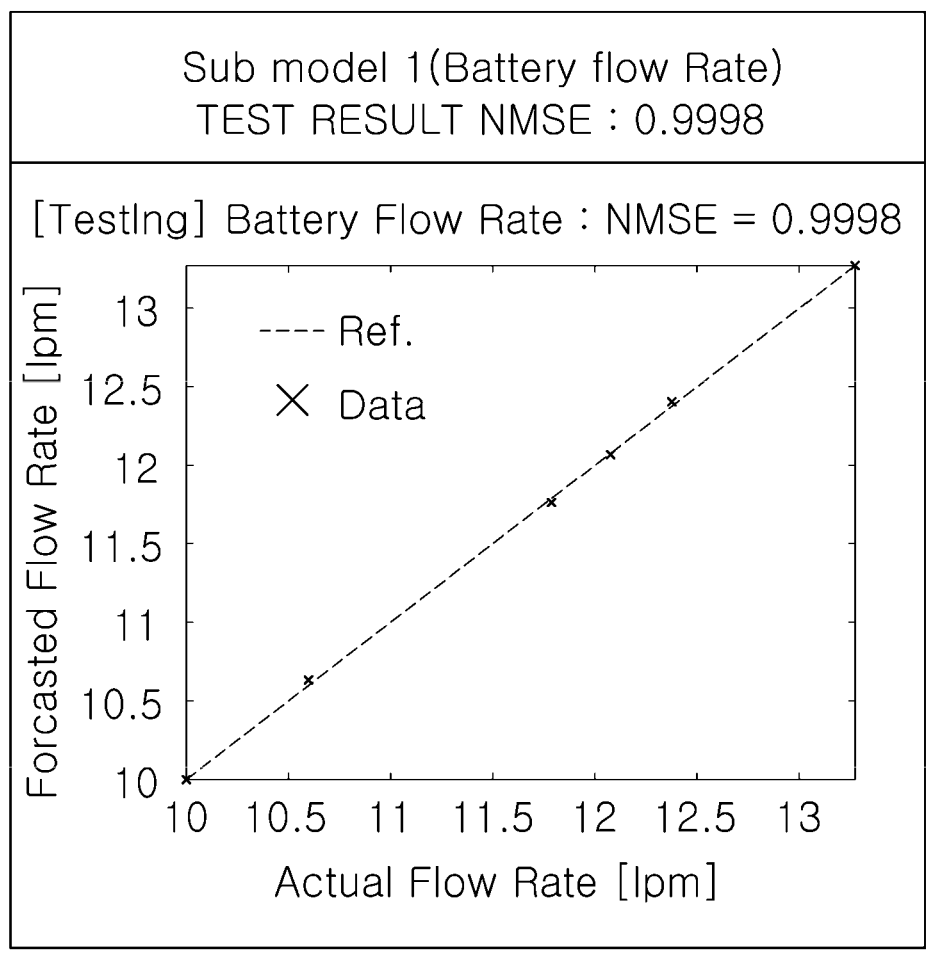
FIGS. 11A-11C are graphs showing accuracy of the cooling system temperature prediction apparatus according to the embodiment of FIG. 5.
Figure 11B:
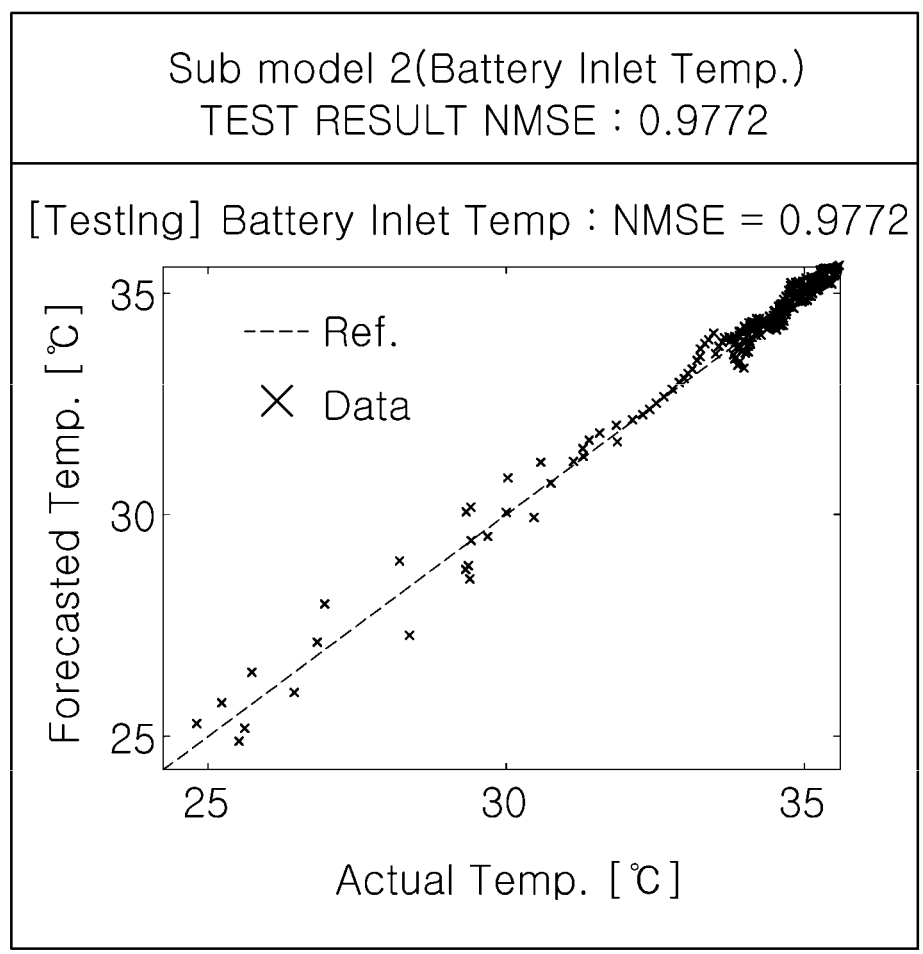
Figure 11C:
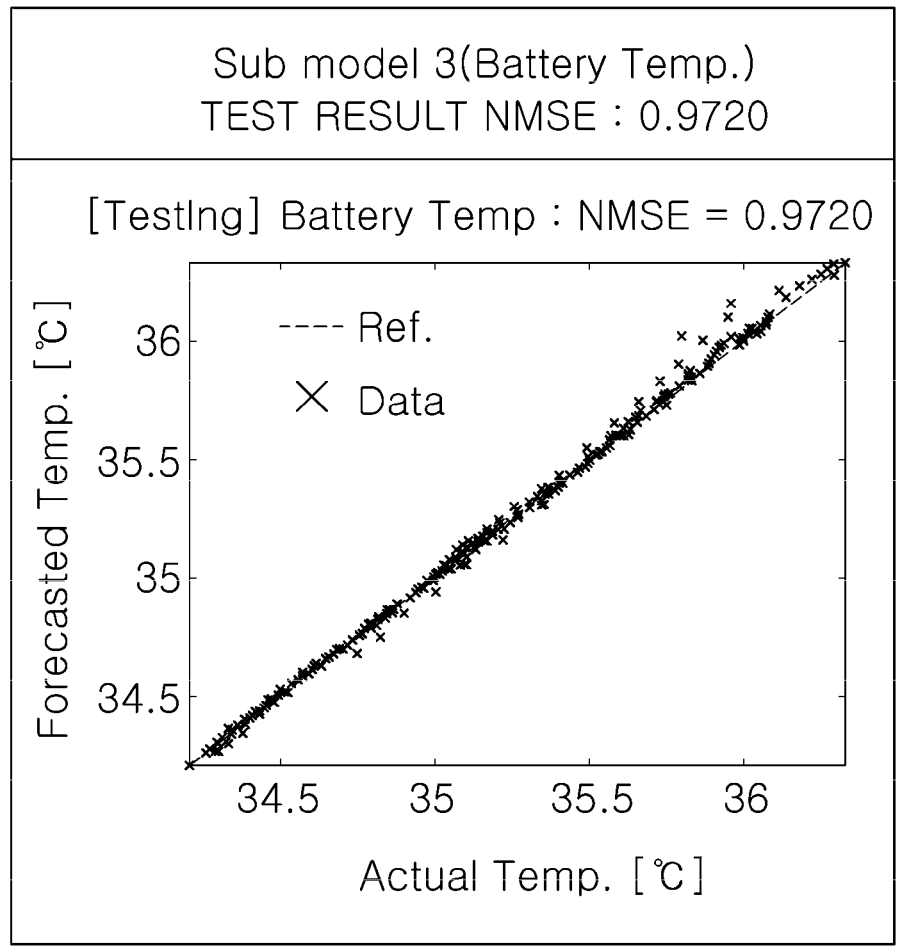

FIGS. 11A-11C are graphs showing accuracy of the cooling system temperature prediction apparatus according to the embodiment of FIG. 5.

Referring to FIGS. 11A-11C, a test result of accuracy when each submodel of the cooling system temperature prediction apparatus for predicting battery temperature in divisional control according to an embodiment of the present disclosure is shown.

In order to test accuracy, a Normalized Mean Square Error (NMSE) can be used, but the present disclosure is not limited thereto.

Referring to FIGS. 11A-11C, the accuracy of a battery pump flow rate according to the calculation result through the first submodel was 99.98%, the accuracy of battery inlet cooling water temperature according to the calculation result through the second submodel was 97.72%, and the accuracy of battery prediction temperature according to the calculation result through the third submodel was 97.2%, in which it can be seen that the accuracy considerably increased in comparison to a temperature prediction apparatus based on an artificial neural network having accuracy of low 80% in the related art.

Figure 12A:
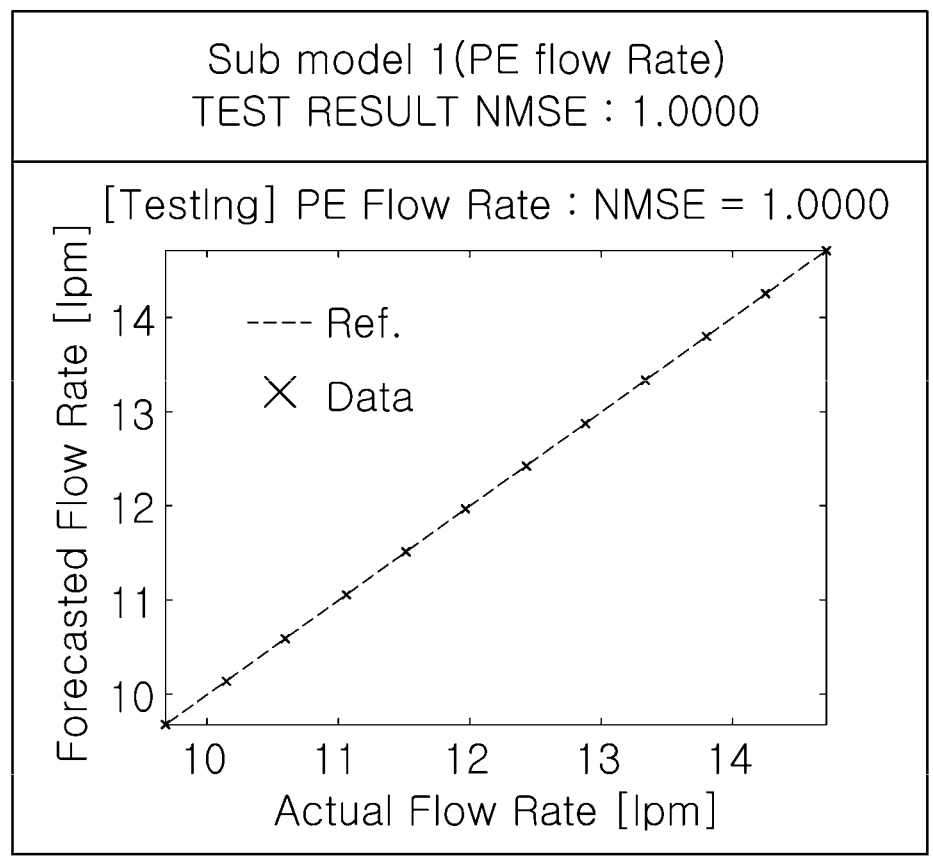
FIGS. 12A-12C are graphs showing accuracy of the cooling system temperature prediction apparatus according to the embodiment of FIG. 7.
Figure 12B:
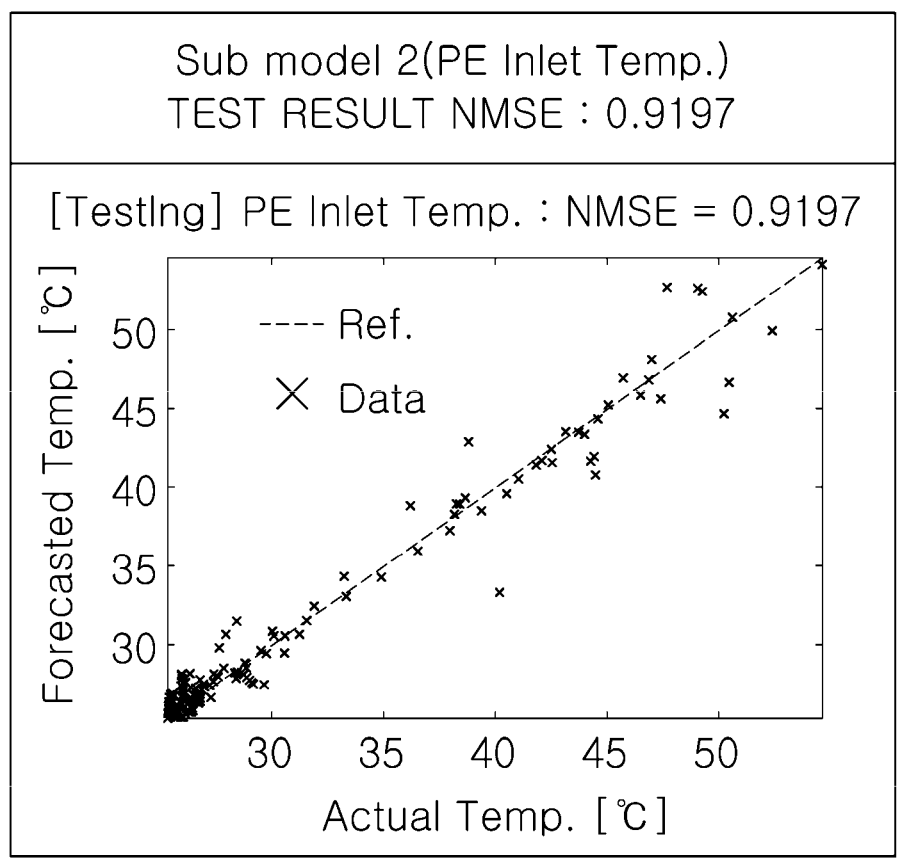
Figure 12C:
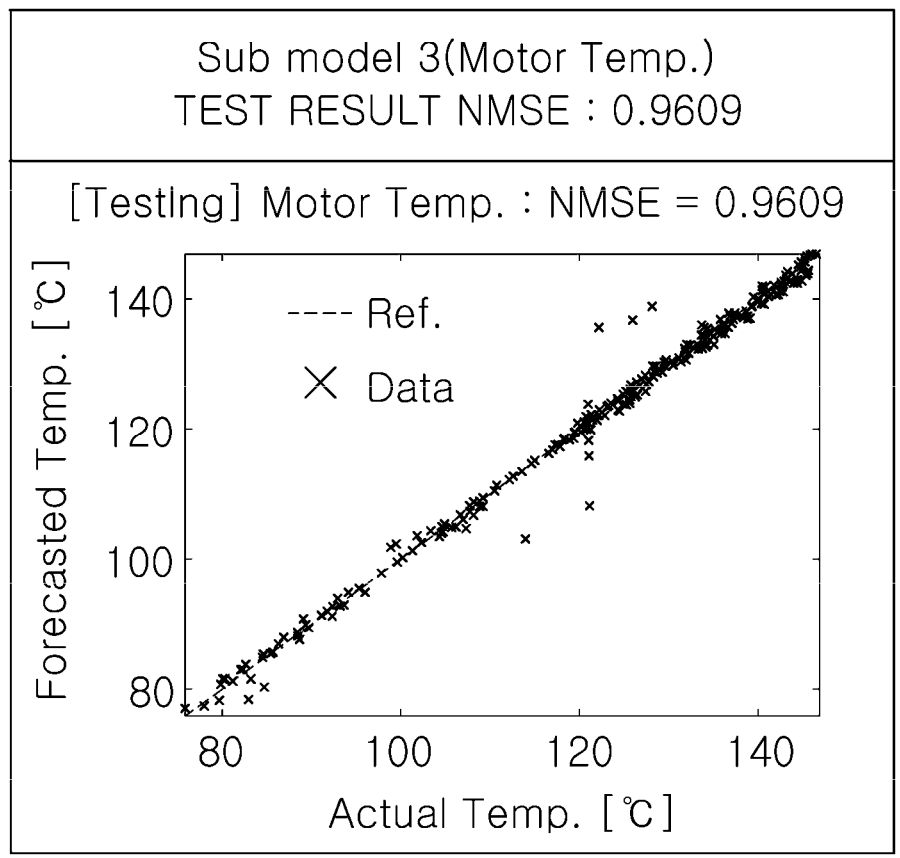
Figure 13A:
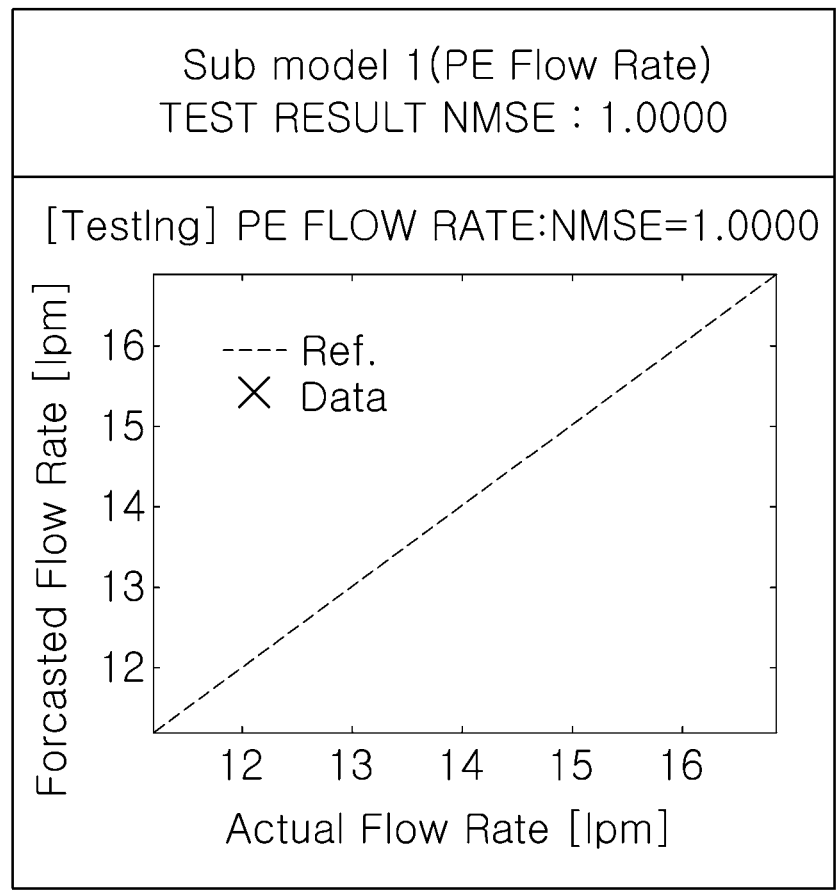
FIGS. 13A-13E are graphs showing accuracy of the cooling system temperature prediction apparatus according to the embodiment of FIG. 10.
Figure 13B:
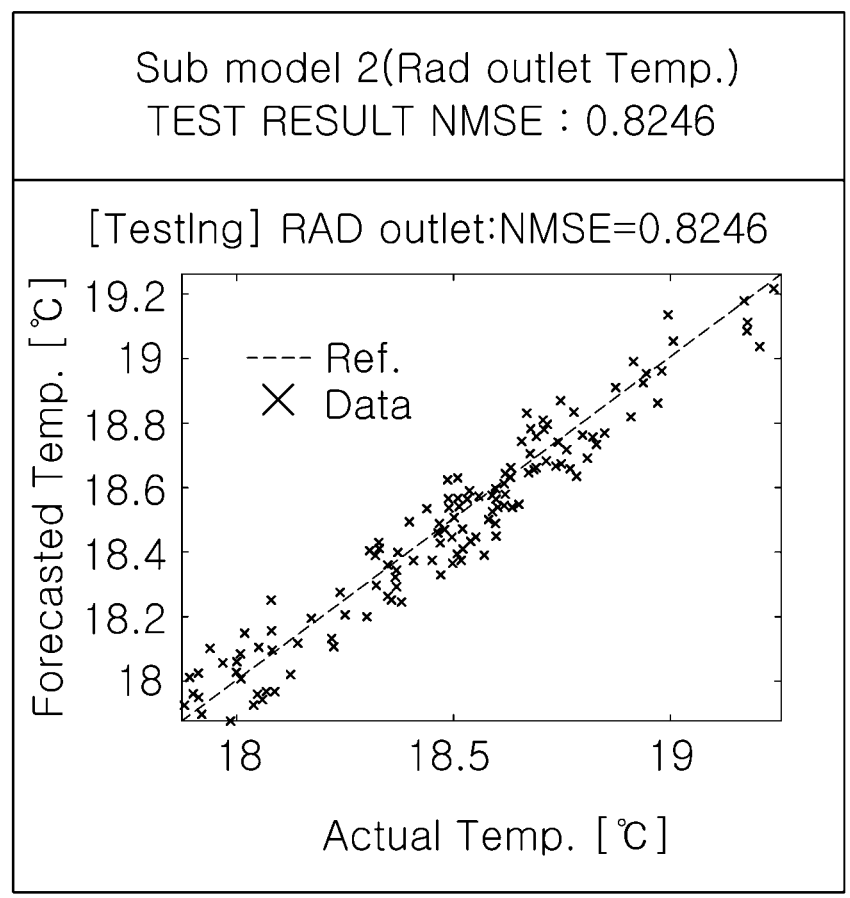
Figure 13C:
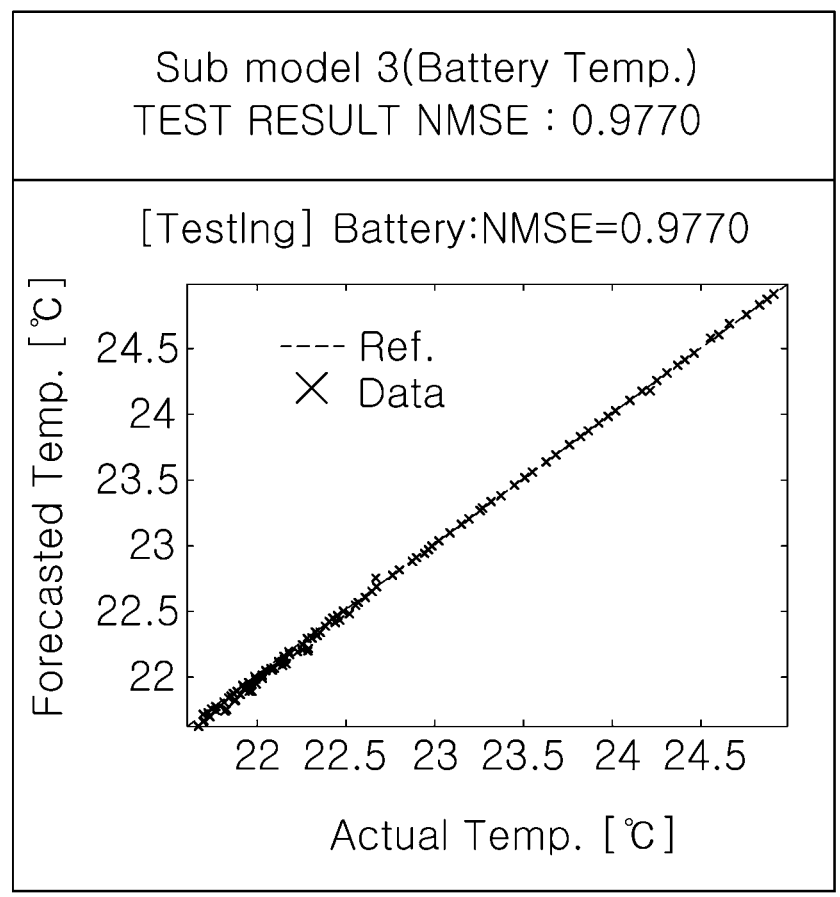
Figure 13D:
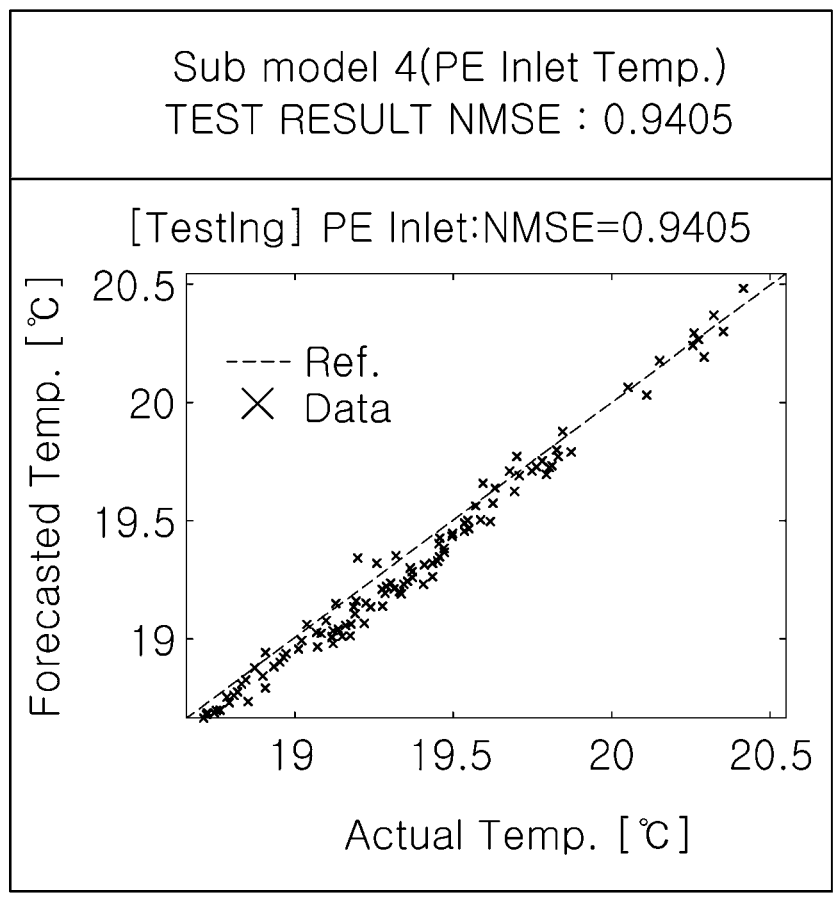
Figure 13E:
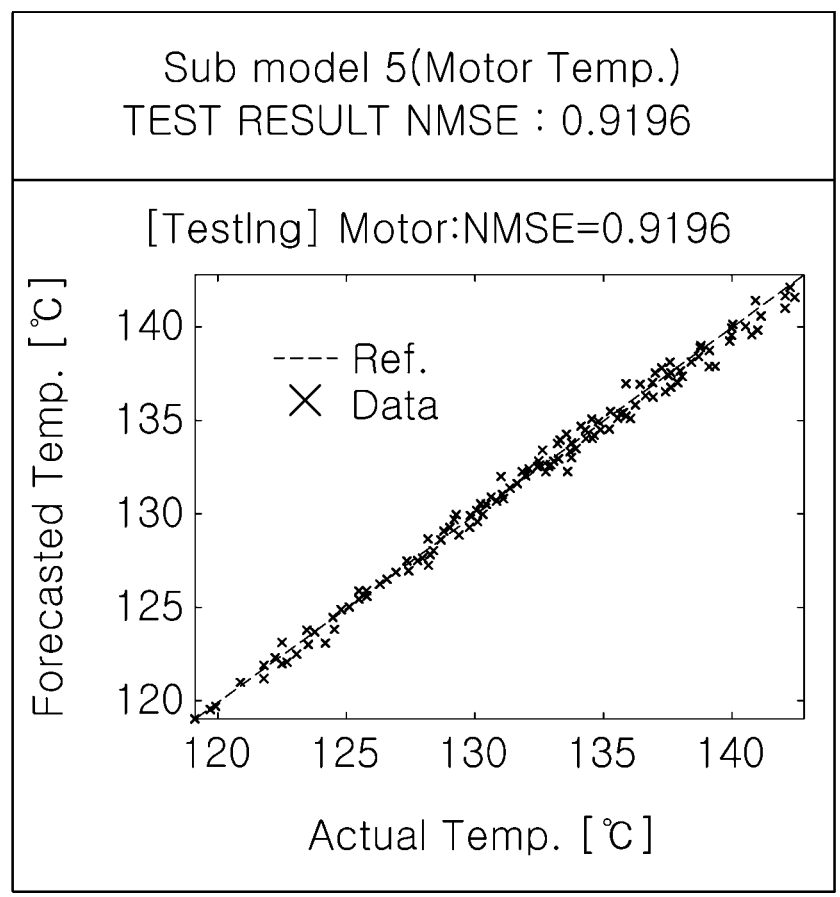

FIGS. 12A-12C are graphs showing accuracy of the cooling system temperature prediction apparatus according to the embodiment of FIG. 7.

Referring to FIGS. 12A-12C, a test result of accuracy when each submodel of the cooling system temperature prediction apparatus for predicting motor temperature in divisional control according to an embodiment of the present disclosure is shown.

Referring to FIGS. 12A-12C, the accuracy of a PE pump flow rate according to the calculation result through the first submodel was 100%, the accuracy of PE inlet cooling water temperature according to the calculation result through the second submodel was 91.97%, and the accuracy of motor prediction temperature according to the calculation result through the third submodel was 96.09%, in which it can be seen that the accuracy considerably increased in comparison to a temperature prediction apparatus based on an artificial neural network having accuracy of low 80% in the related art.

FIGS. 13A-13E are graphs showing accuracy of the cooling system temperature prediction apparatus according to the embodiment of FIG. 10.

Referring to FIGS. 13A-13E, a test result of accuracy when each submodel of the cooling system temperature prediction apparatus for predicting temperature of a battery and a motor in integral control according to an embodiment of the present disclosure is shown.

Referring to FIGS. 13A-13E, the accuracy of a PE pump flow rate according to the calculation result through the first submodel was 100%, the accuracy of radiator outlet cooling water temperature according to the calculation result through the second submodel was 82.46%, and the accuracy of battery prediction temperature according to the calculation result through the third submodel was 97.7%, the accuracy of PE inlet cooling water temperature according to the calculation result through the fourth submodel was 94.05%, and the accuracy of motor prediction temperature according to the calculation result through the fifth submodel was 91.96%, in which it can be seen that the accuracy considerably increased in comparison to a temperature prediction apparatus based on an artificial neural network having accuracy of low 80% in the related art.

Figure 14:
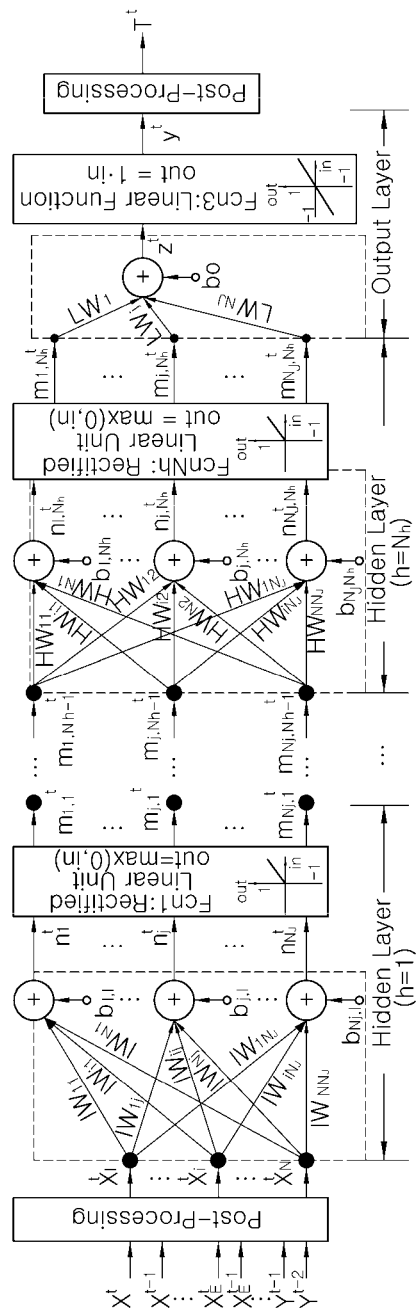
FIG. 14 is a diagram showing an artificial neural network actually implemented in accordance with an embodiment of the present disclosure.

FIG. 14 is a diagram showing an artificial neural network actually implemented in accordance with an embodiment of the present disclosure.

A deep learning base cooling system temperature prediction apparatus including an artificial neural network including a plurality of submodels in accordance with an embodiment of the present disclosure may be implemented, as shown in FIG. 14, in which each of the submodels may include an input layer, a hidden layer, and an output layer and an artificial neural network structure including these submodels in several layers may be provided.

According to an embodiment of the present disclosure, by increasing and decreasing variables that are input to each submodel with other conditions maintained, it is possible to evaluate suitability of the submodels by measuring and analyzing the output of each submodel. Further, the higher the suitability, the smaller the excessive suitability, so higher accuracy can be shown.

Figure 15:
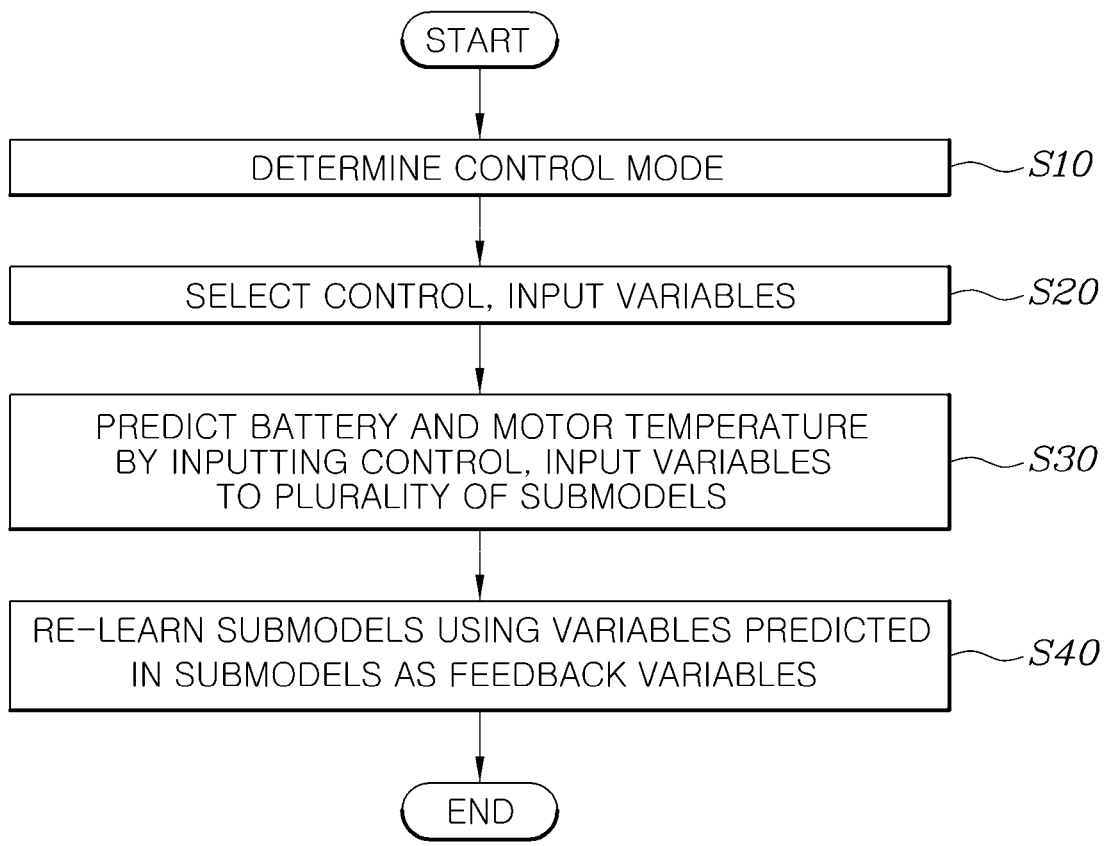
FIG. 15 is a flowchart of a deep learning-based cooling system temperature prediction method according to physical causality according to an embodiment of the present disclosure.

FIG. 15 is a flowchart of a deep learning-based cooling system temperature prediction method according to physical causality according to an embodiment of the present disclosure.

A control mode is determined (S10).

According to an embodiment of the present disclosure, the control mode can be determined as one of divisional control or integral control.

According to an embodiment of the present disclosure, the cooling system compares battery temperature and radiator output temperature, and when the battery temperature is higher, integral control is determined and the cooling system can be operated in the integral control. Further, the cooling system compares battery temperature and radiator output temperature, and when the battery temperature lower, divisional control is determined and the cooling system can be operated in the divisional control.

Control and input variables are selected (S20).

According to an embodiment of the present disclosure, it is possible to use an artificial neural network formed by connecting artificial neural network submodels each including an input layer, a hidden layer, and an output layer, and it is possible to select and input at least one of predetermined control variable, environment variable, and time variable to a plurality of submodels in accordance with physical causality.

The predetermined physical causality may be based on a formula that can calculate a system temperature variation of the cooling system, which is as the above Formula 1.

Referring to Formula 1, it is possible to derive physical causality in the cooling system, the flow rate is proportioned to the pump power, and the battery inlet cooling water temperature decreases as the wind amount of the fan increases, the operation amount of the compressor increases, and the battery output current decreases. Further, when the flow rate is large, the change level of temperature may decrease.

Further, prediction temperature of the battery may increase as the heat generation amount increases, and may decrease as the temperature of cooling water decreases and the flow rate increases.

Further, the PE inlet cooling water temperature decreases as the wind amount of the fan increases, the temperature variation may decrease as the flow rate increases, and the external air temperature may increase as the motor power consumption increases.

When a vehicle speed is high, a RAD-through wind amount increases, so that the PE inlet cooling water temperature may decrease, and may increase as inverter temperature increases.

In addition, the prediction temperature of a motor can increase as the heat generation amount is large, and can decrease as the cooling water temperature decreases and the flow rate increases.

Battery and motor temperature is predicted by inputting the control and input variables to a plurality of submodels (S30).

According to an embodiment of the present disclosure, the cooling system temperature prediction apparatus for predicting battery temperature in divisional control can use three submodels (first, second, and third submodels) to predict temperature of a battery and the variables that are input to and output from each submodel are as the above Table 1.

According to an embodiment of the present disclosure, the first submodel can calculate a battery pump flow speed by inputting a battery pump power consumption variable.

According to the embodiment, the second submodel can calculate the battery inlet cooling water temperature by inputting the air fan power consumption, compressor power consumption, AC on or off, battery current, and battery pump flow rate variables.

According to the embodiment, the third submodel can calculate battery prediction temperature by inputting the variables of battery current, battery input cooling water, and battery pump flow rate.

According to an embodiment of the present disclosure, the cooling system temperature prediction apparatus for predicting motor temperature in divisional control can use three submodels (first, second, and third submodels) to predict temperature of a battery and the variables that are input to and output from each submodel are as seen in the above Table 2.

According to an embodiment of the present disclosure, the first submodel can calculate the PE cooling water flow rate by inputting the PE pump power consumption variable and the second submodel can calculate the PE inlet cooling water temperature by inputting the air fan power consumption, PE cooling water flow rate, motor power consumption, external temperature, vehicle speed, and inverter temperature variables.

According to the embodiment, the third submodel can calculate motor prediction temperature by inputting the PE inlet cooling water temperature, PE cooling water flow rate, motor power consumption, inverter temperature, and battery voltage variables.

A cooling system temperature prediction apparatus in integral control according to an embodiment of the present disclosure can perform calculation through five submodels (first, second, third, fourth, and fifth submodels) to predict temperature of a battery and a motor.

According to the embodiment, variables that can be input to each submodel are as seen in the above Table 3.

According to an embodiment of the present disclosure, the first submodel 130 can calculate the cooling water flow rate by inputting the pump power consumption variable and the second submodel 230 can calculate the radiator outlet cooling water temperature by inputting the air fan power consumption, PE cooling water flow rate, motor power consumption, external temperature, vehicle speed, and inverter temperature variables.

Further, according to the embodiment, the third submodel (330) can calculate the battery prediction temperature by inputting the radiator outlet cooling water temperature, cooling water flow rate, and battery current variables, and the fourth submodel can calculate the PE inlet cooling water temperature by inputting the radiator outlet cooling water temperature, a vehicle speed, battery prediction temperature, external air temperature, and cooling water flow rate variables.

According to the embodiment, the fifth submodel can calculate motor prediction temperature by inputting the motor power consumption, cooling water flow rate, PE inlet cooling water temperature, battery voltage, and inverter temperature variables.

The submodels are re-learned by inputting the variables predicted in the submodels as feedback variables (S40).

According to an embodiment of the present disclosure, the cooling system temperature prediction apparatus for predicting battery temperature in divisional control can use three submodels (first, second, and third submodels) to predict and re-learn temperature of a battery and the variables that are input to and output from each submodel are as follows.

According to an embodiment of the present disclosure, it is possible to calculate a battery pump flow rate by inputting a battery pump flow rate variable of the previous prediction section as a battery pump power consumption variable and a feedback variable to the first submodel.

Further, it is possible to calculate battery inlet cooling water temperature by inputting air fan power consumption, compressor power consumption, AC on or off, battery current, and battery pump flow rate variables, and a battery inlet cooling water temperature variable of the previous prediction section as a feedback variable to the second submodel. Further, it is possible to calculate the battery prediction temperature by inputting battery current, battery inlet cooling water temperature, and battery pump flow rate variables, and a battery prediction temperature variable of the previous prediction section as a feedback variable to the third submodel.

According to an embodiment of the present disclosure, the cooling system temperature prediction apparatus for predicting motor temperature in divisional control can use three submodels (first, second, and third submodels) to predict and re-learn temperature of a battery and the variables that are input to and output from each submodel are as follows.

According to an embodiment of the present disclosure, the first submodel can calculate the PE cooling water flow rate by inputting the PE pump power consumption variable, and the PE cooling water flow rate variable of the previous prediction section as a feedback variable, and the second submodel can calculate the PE inlet cooling water temperature by inputting the air fan power consumption, PE cooling water flow rate, motor power consumption, external temperature, vehicle speed, and inverter temperature variables, and the PE inlet cooling water temperature of the previous prediction section as a feedback variable.

Further, the third submodel can calculate the motor prediction temperature by inputting the PE inlet cooling water temperature, PE cooling water flow rate, motor power consumption, inverter temperature, and battery voltage variables, and the motor prediction temperature of the previous prediction section as a feedback variable.

According to an embodiment of the present disclosure, it is possible to perform re-learning by inputting the variables described above and additionally inputting a specific variable calculated in the previous prediction section as a feedback variable to the second to fifth submodels.

According to an embodiment, the second submodel can calculate the radiator output cooling water temperature by inputting the air fan power consumption, cooling water flow rate, motor power consumption, external air temperature, vehicle speed, and inverter temperature variables, and the radiator outlet cooling water temperature variable of the previous prediction section as a feedback variable.

According to the embodiment, the third submodel can calculate the battery prediction temperature by inputting the radiator outlet cooling water temperature, cooling water flow rate, and battery current variables, and the battery prediction temperature variable of the previous prediction section as a feedback variable.

According to the embodiment, the fourth submodel can calculate the PE inlet cooling water temperature by inputting the radiator outlet cooling water temperature, vehicle speed, battery prediction temperature, external air temperature, and cooling water flow rate variables, and the PE inlet cooling water temperature variable of the previous prediction section as a feedback variable. Further, the fifth submodel can calculate the motor prediction temperature by inputting the motor power consumption, cooling water flow rate, PE inlet cooling water temperature, battery voltage, and inverter temperature variables, and the motor prediction temperature variable of the previous prediction section as a feedback variable.

Embodiments of the present disclosure are not achieved only through the apparatus and/or method described in detail above. Further, the scope of the present disclosure is not limited thereto and various changes and modifications by those skilled in the art using the fundamental concept of the present disclosure defined in the following claims should be understood as being included in the scope of the present disclosure.

What is claimed is:

1. A cooling system using an artificial neural network configured to output prediction results according to a physical causality, comprising:
 a compressor configured to operate according to the prediction results which is provided by the artificial neural network which is modeled by connecting a plurality of artificial neural network submodels, each of the plurality of artificial neural network submodels including an input layer, a hidden layer, and an output layer, wherein the plurality of artificial neural network submodels are configured to predict the prediction results including a pump flow speed, a cooling water flow rate, a battery inlet cooling water temperature, a motor inlet cooling water temperature, a radiator outlet cooling water temperature, a battery temperature, and a motor temperature by inputting at least one of a predetermined control variable, an environment variable, or a time variable in accordance with the physical causality, and wherein a number of the plurality of artificial neural network submodels and the control variables or environment variables that are sequentially input to each submodel, depend on divisional control and integral control of the cooling system.

2. The system of claim 1, wherein, when the deep learning-based cooling system is divisionally controlled, calculation can be performed through first, second, and third submodels to predict the battery temperature, wherein the first submodel calculates a battery pump flow speed by inputting a battery pump power consumption variable, wherein the second submodel calculates the battery inlet cooling water temperature by inputting an air fan power consumption, a compressor power consumption, an air conditioning (AC) on or off state, a battery current, and battery pump flow rate variables, and wherein the third submodel calculates a battery prediction temperature by inputting the battery current, the battery inlet cooling water temperature, and the battery pump flow rate variables.

3. The system of claim 1, wherein, when the cooling system is divisionally controlled, calculation can be performed through the first, second, and third submodels to predict the motor temperature, wherein the first submodel calculates a PE pump cooling water flow rate by inputting a PE pump power consumption variable, wherein the second submodel calculates a PE pump inlet cooling water temperature by inputting an air fan power consumption, the PE pump cooling water flow rate, a motor power consumption, an external air temperature, a vehicle speed, and inverter temperature variables, and wherein the third submodel calculates a motor prediction temperature by inputting the PE pump inlet cooling water temperature, the PE pump cooling water flow rate, the motor power consumption, an inverter temperature, and battery voltage variables.

4. The system of claim 1, wherein, when the cooling system is integrally controlled, calculation can be performed through first, second, third, fourth, and fifth submodels to predict the motor temperature, wherein the first submodel calculates the cooling water flow rate by inputting a PE pump power consumption variable, wherein the second submodel calculates the radiator outlet cooling water temperature by inputting an air fan power consumption, the cooling water flow rate, a motor power consumption, an external air temperature, a vehicle speed, and inverter temperature variables, wherein the third submodel calculates a battery prediction temperature by inputting the radiator outlet cooling water temperature, the cooling water flow rate, and battery current variables, wherein the fourth submodel calculates a PE pump inlet cooling water temperature by inputting the radiator outlet cooling water temperature, a vehicle speed, the battery prediction temperature, the external air temperature, and cooling water flow rate variables, and wherein the fifth submodel calculates a motor prediction temperature by inputting the motor power consumption, the cooling water flow rate, the PE pump inlet cooling water temperature, a battery voltage, and the inverter temperature variables.

5. The system of claim 2, wherein, in order to learn the artificial neural network, the system is configured to:

calculate a battery pump flow rate by inputting a battery pump power consumption variable, and a battery pump flow rate variable of a previous prediction section as a feedback variable to the first submodel, calculate the battery inlet cooling water temperature by inputting the air fan power consumption, the compressor power consumption, the AC on or off state, the battery current, the battery pump flow rate variables, and a battery inlet cooling water temperature variable of the previous prediction section as a feedback variable to the second submodel, and calculate the battery prediction temperature by inputting the battery current, the battery inlet cooling water temperature, the battery pump flow rate variables, and a battery prediction temperature variable of the previous prediction section as a feedback variable to the third submodel.

6. The system of claim 3, wherein, in order to learn the artificial neural network, the first submodel calculates the PE pump cooling water flow rate by inputting the PE pump power consumption variable, and a PE pump cooling water flow rate variable of a previous prediction section as a feedback variable, the second submodel calculates the PE pump inlet cooling water temperature by inputting the air fan power consumption, the PE pump cooling water flow rate, the motor power consumption, the external air temperature, the vehicle speed, the inverter temperature variables, and a PE pump inlet cooling water temperature of the previous prediction section as a feedback variable, and the third submodel calculates the motor prediction temperature by inputting the PE pump inlet cooling water temperature, the PE pump cooling water flow rate, the motor power consumption, the inverter temperature, the battery voltage variables, and a motor prediction temperature of the previous prediction section as a feedback variable.

7. The system of claim 4, wherein, in order to learn the artificial neural network, the second submodel calculates the radiator outlet cooling water temperature by inputting the air fan power consumption, the cooling water flow rate, the motor power consumption, the external air temperature, the vehicle speed, the inverter temperature variables, and a radiator outlet cooling water temperature variable of a previous prediction section as a feedback variable, the third submodel calculates the battery prediction temperature by inputting the radiator outlet cooling water temperature, the cooling water flow rate, the battery current variables, and a battery prediction temperature variable of the previous prediction section as a feedback variable, the fourth submodel calculates the PE pump inlet cooling water temperature by inputting the radiator outlet cooling water temperature, the vehicle speed, the battery prediction temperature, the external air temperature, the cooling water flow rate variables, and a PE pump inlet cooling water temperature variable of the previous prediction section as a feedback variable, and the fifth submodel calculates the motor prediction temperature by inputting the motor power consumption, the cooling water flow rate, the PE pump inlet cooling water temperature, the battery voltage, the inverter temperature variables, and a motor prediction temperature variable of the previous prediction section as a feedback variable.

8. The system of claim 1, wherein the plurality of artificial neural network submodels may use a rectified linear unit (ReLU) as an active function.

9. A deep learning-based cooling system temperature prediction method according to a physical causality, the method using an artificial neural network modeled by connecting a plurality of artificial neural network submodels each including an input layer, a hidden layer, and an output layer, and the method comprising:
 determining a control mode as one of a divisional control and an integral control;
 selecting at least one of a control variable, an environment variable, or a time variable set in advance in the plurality of artificial neural network submodels, depending on the divisional control and the integral control, in accordance with the physical causality, for a number of the artificial neural network submodels, wherein the control variable and the environment variable are sequentially input to each of the plurality of artificial neural network submodels in accordance with the determined control mode;
 predicting a pump flow speed, a cooling water flow rate, a battery inlet cooling water temperature, a motor inlet cooling water temperature, a radiator outlet cooling water temperature, a battery temperature, and a motor temperature by inputting the selected variable to the plurality of artificial neural network submodels; and
 learning the plurality of artificial neural network submodels by using the variables predicted in the submodels as feedback variables.

10. The method of claim 9, wherein, when the cooling system is divisionally controlled, calculation can be performed through first, second, and third submodels to predict the battery temperature, and
 wherein the method further includes:
 calculating a battery pump flow speed by inputting a battery pump power consumption variable in the first submodel,
 calculating the battery inlet cooling water temperature by inputting an air fan power consumption, a compressor power consumption, an air conditioning (AC) on or off state, a battery current, and battery pump flow rate variables in the second submodel, and
 calculating a battery prediction temperature by inputting battery current, the battery inlet cooling water temperature, and the battery pump flow rate variables in the third submodel.

11. The method of claim 9, wherein, when the cooling system is divisionally controlled, calculation can be performed through first, second, and third submodels to predict the temperature of the motor, and wherein the method further includes:
 calculating a PE pump cooling water flow rate by inputting a PE pump power consumption variable in the first submodel,
 calculating a PE pump inlet cooling water temperature by inputting the air fan power consumption, the PE pump cooling water flow rate, a motor power consumption, an external air temperature, a vehicle speed, and inverter temperature variables in the second submodel, and
 calculating a motor prediction temperature by inputting the PE pump inlet cooling water temperature, the PE pump cooling water flow rate, the motor power consumption, an inverter temperature, and battery voltage variables in the third submodel.

12. The method of claim 9, wherein, when the cooling system is integrally controlled, calculation can be performed through first, second, third, fourth, and fifth submodels to predict the temperature of the motor, and
 wherein the method further includes:
 calculating the cooling water flow rate by inputting a PE pump power consumption variable in the first submodel,
 calculating the radiator outlet cooling water temperature by inputting the air fan power consumption, the cooling water flow rate, a motor power consumption, an external air temperature, a vehicle speed, and inverter temperature variables in the second submodel,
 calculating a battery prediction temperature by inputting the radiator outlet cooling water temperature, the cooling water flow rate, and battery current variables in the third submodel,
 calculating a PE pump inlet cooling water temperature by inputting the radiator outlet cooling water temperature, the vehicle speed, the battery prediction temperature, the external air temperature, and cooling water flow rate variables in the fourth submodel, and
 calculating motor prediction temperature by inputting the motor power consumption, the cooling water flow rate, the PE pump inlet cooling water temperature, a battery voltage, and the inverter temperature variables in the fifth submodel.

13. The method of claim 10, wherein, in order to learn the artificial neural network, the method further comprises:
 calculating a battery pump flow rate by inputting the battery pump power consumption variable, and a battery pump flow rate variable of a previous prediction section as a feedback variable to the first submodel;
 calculating the battery inlet cooling water temperature by inputting an air fan power consumption, the compressor power consumption, the AC on or off state, the battery current, the battery pump flow rate variables, and a battery inlet cooling water temperature variable of the previous prediction section as a feedback variable to the second submodel; and
 calculating the battery prediction temperature by inputting the battery current, the battery inlet cooling water temperature, the battery pump flow rate variables, and a battery prediction temperature variable of the previous prediction section as a feedback variable to the third submodel.

14. The method of claim 11, wherein, in order to learn the artificial neural network,
 the first submodel calculates the PE pump cooling water flow rate by inputting the PE pump power consumption variable and a PE pump cooling water flow rate variable of a previous prediction section as a feedback variable, the second submodel calculates the PE pump inlet cooling water temperature by inputting the air fan power consumption, the PE pump cooling water flow rate, the motor power consumption, the external air temperature, the vehicle speed, the inverter temperature variables, and a PE pump inlet cooling water temperature of the previous prediction section as a feedback variable, and the third submodel calculates the motor prediction temperature by inputting the PE pump inlet cooling water temperature, the PE pump cooling water flow rate, the motor power consumption, the inverter temperature, the battery voltage variables, and a motor prediction temperature of the previous prediction section as a feedback variable.

15. The method of claim 12, wherein the second submodel calculates the radiator outlet cooling water temperature by inputting the air fan power consumption, the cooling water flow rate, the motor power consumption, the external air temperature, the vehicle speed, the inverter temperature variables, and a radiator outlet cooling water temperature variable of the previous prediction section as a feedback variable, wherein the third submodel calculates the battery prediction temperature by inputting the radiator outlet cooling water temperature, the cooling water flow rate, the battery current variables, and a battery prediction temperature variable of the previous prediction section as a feedback variable, wherein the fourth submodel calculates the PE pump inlet cooling water temperature by inputting the radiator outlet cooling water temperature, the vehicle speed, the battery prediction temperature, the external air temperature, the cooling water flow rate variables, and a PE pump inlet cooling water temperature variable of the previous prediction section as a feedback variable, and wherein the fifth submodel calculates the motor prediction temperature by inputting the motor power consumption, cooling water flow rate, the PE pump inlet cooling water temperature, the battery voltage, the inverter temperature variables, and a motor prediction temperature variable of the previous prediction section as a feedback variable.

16. The method of claim 9, wherein the plurality of artificial neural network submodels may use a rectified linear unit (ReLU) as an active function.

\* \* \* \* \*